US012779484B2

(12) United States Patent
Ding et al.

(10) Patent No.: US 12,779,484 B2
(45) Date of Patent: Nov. 3, 2026

(54) NOZZLE PARAMETER MEASURING DEVICE, MEASURING METHOD, AND MEASURING SYSTEM FOR USING THE SAME

(71) Applicant: DELTA ELECTRONICS, INC., Taoyuan City (TW)

(72) Inventors: Ren-Feng Ding, Taoyuan City (TW); Keng-Ning Chang, Taoyuan City (TW); Chia-Jun Yu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 245 days.

(21) Appl. No.: 18/890,002

(22) Filed: Sep. 19, 2024

(65) Prior Publication Data

US 2025/0375785 A1 Dec. 11, 2025

(30) Foreign Application Priority Data

Jun. 5, 2024 (CN) ........................ 202410719080.X

(51) Int. Cl.
*B05B 12/00* (2018.01)
*G01B 11/02* (2006.01)

(52) U.S. Cl.
CPC ............ *B05B 12/004* (2013.01); *G01B 11/02* (2013.01)

(58) Field of Classification Search
CPC ... B05B 12/004; B05B 12/082; B05B 9/0426; G01B 11/02; G01B 21/10
See application file for complete search history.

(56) References Cited

U.S. PATENT DOCUMENTS

2016/0016186 A1 1/2016 Hofschulte et al.
2019/0374966 A1 12/2019 Thompson et al.
2021/0033391 A1 2/2021 Isei et al.
2021/0215479 A1 7/2021 Liu et al.
(Continued)

FOREIGN PATENT DOCUMENTS

CN 102506765 A 6/2012
CN 104536281 A 4/2015
(Continued)

OTHER PUBLICATIONS

Office Action dated Feb. 4, 2025 of the corresponding Taiwan patent application No. 113120784.

*Primary Examiner* — Abdullahi Nur
(74) *Attorney, Agent, or Firm* — Muncy, Geissler, Olds & Lowe, P.C.

(57) ABSTRACT

A nozzle parameter measuring device is used for measuring a spraying width of a nozzle to be measured when the nozzle sprays a coating material and includes a connection part, a measuring kit, and a sensing part. The connection part is connected to the nozzle and the measuring kit. The measuring kit is a hollow cylinder with an inner wall. The nozzle sprays a coating material toward the inside of the measuring kit so that the coating material is coated on the inner wall of the measuring kit. The sensing part is connected to another side of the measuring kit relative to the connection part and has a light sensor disposed in the direction of the nozzle. The light sensor is configured for detecting a time when an emitted light being covered, and a spraying width of the nozzle is calculated.

14 Claims, 10 Drawing Sheets

(56) References Cited

U.S. PATENT DOCUMENTS

| | | | |
|---|---|---|---|
| 2021/0220856 | A1 | 7/2021 | Schwarzenbolz |
| 2021/0379612 | A1 | 12/2021 | Volk et al. |

FOREIGN PATENT DOCUMENTS

| | | | | |
|---|---|---|---|---|
| CN | 105215991 | A | 1/2016 | |
| CN | 105277101 | A | 1/2016 | |
| CN | 205940483 | U | 2/2017 | |
| CN | 109282978 | A | 1/2019 | |
| CN | 111175200 | A | 5/2020 | |
| CN | 112533705 | A | 3/2021 | |
| CN | 113740047 | A | 12/2021 | |
| CN | 115780125 | A | 3/2023 | |
| CN | 115874780 | A | 3/2023 | |
| EP | 1839764 | A1 * | 10/2007 | ............... B05D 3/00 |
| KR | 102109849 | B1 * | 5/2020 | ............. B05B 15/68 |
| TW | 201936265 | A | 9/2019 | |
| WO | 2017186678 | A1 | 11/2017 | |
| WO | 2018136499 | A1 | 7/2018 | |

* cited by examiner

NOZZLE PARAMETER MEASURING DEVICE, MEASURING METHOD, AND MEASURING SYSTEM FOR USING THE SAME

BACKGROUND OF THE DISCLOSURE

Technical Field

The disclosure relates to a nozzle for spraying a coating material, and is particularly to a measuring device, a measuring method, and a measuring system of measuring a spraying width of a nozzle.

Description of Related Art

In order to ensure predictability of spraying behavior in automated equipment, a digital twin system establishing a spraying behavior model for a nozzle used to simulate and predict in advance is very important. To establish the spraying behavior model, knowing various parameters depending on the nozzle is necessary. However, current common parameter measuring methods measure the parameter inaccurately.

Reference is made to FIG. 1, which is a schematic diagram of a spraying width spreading with a measurement time in the related art. As shown in FIG. 1, the measuring method used in the related technology is to make the nozzle 1 to be measured spray coating material 12 directly facing a reference plane 13, and measure a diameter D of the spraying width of the nozzle 1 by directly spraying the coating material 12 on the reference plane 13. A height H of the spraying width is a vertical distance between the nozzle 1 and the reference plane 13, and the height H is fixed information. Through the diameter D and height H, an angle θ of the spraying width is calculated. This measuring method is also called an overhead projection measuring method.

Generally, the nozzle 1 to be measured continuously sprays the coating material 12 on the reference plane 13 through high-pressure gas. Since atomization of the coating material 12, airflow pushes the coating material 12 toward outside of the reference plane 13 over time, causing the diameter D of the spraying width to expand toward the outside of the reference plane 13. As shown in FIG. 1, since the diameter D of the spraying width increases with a spraying time, the angle θ calculated based on the diameter D and height H becomes inaccurate.

In addition, the aforementioned measuring method requires a processor of the system to control the throttle valve (not shown in the figure) to open through electrical signals, next mix the coating material 12 and the high-pressure gas by a spraying device, and next transport the coating material 12 to the nozzle 1 via a pipeline and the throttle valve and spray externally. When using this measuring method, factors such as transmission of electrical signals, compressibility of the high-pressure gas, and actual pipeline conditions cause delays in the spraying time, which is also one of reasons for an inaccurate measuring parameter.

In view of this, there is a great need in a market for a novel measuring device that can effectively and accurately measure the parameter of the nozzle, and can thereby optimize the simulation and prediction behavior of the digital twin system.

SUMMARY OF THE DISCLOSURE

The purpose of the disclosure provides a nozzle parameter measuring device, a measuring method, and a measuring system to accurately measure a spraying width of a nozzle by projecting size of the spraying width onto a lateral horizontal plane.

In one of the exemplary embodiments, the nozzle parameter measuring device of the disclosure is configured for connecting a nozzle to be measured and measuring a spraying width of the nozzle when spraying a coating material, wherein the nozzle parameter measuring device includes:

- a connection part, having a first side for connecting with the nozzle and a second side opposite to the first side;
- a measuring kit, being a hollow cylinder with an inner wall, wherein the measuring kit has a third side connected to the second side and a fourth side opposite to the third side, and the coating material is coated on the inner wall when the nozzle sprays the coating material toward inside of the measuring kit; and
- a sensing part, disposed relative to the fourth side and having a light sensor disposed directly facing a direction of the nozzle, wherein the light sensor is configured for detecting a covering time when an emitted light is covered by the coating material;
- wherein the spraying width is calculated based on a position of the coating material on the inner wall.

In one of the exemplary embodiments, the measuring method of the disclosure is applied to the nozzle parameter measuring device, and includes:

- step a) connecting the nozzle parameter measuring device to a controller;
- step b) connecting the nozzle parameter measuring device to the nozzle (1);
- step c) transmitting a control signal through the controller to control a throttle valve to open, wherein the nozzle sprays the coating material toward the inside of the measuring kit after the throttle valve is opened;
- step d) recording, through the controller, an activation time for transmitting the control signal and the covering time when the emitted light emitted by the light sensor is covered by the coating material;
- step d1) recording the position of the coating material on the inner wall;
- step e) calculating a spraying delay time based on the activation time and the covering time; and
- step f) calculating the spraying width based on the position of the coating material on the inner wall.

In one of the exemplary embodiments, the measuring system of the disclosure includes:

- a throttle valve;
- the nozzle, which one end of the nozzle is connected to the throttle valve;
- the nozzle parameter measuring device, connected to the nozzle; and
- a controller, electrically connected to the throttle valve and the nozzle parameter measuring device, and transmitting a control signal to control the throttle valve to open, wherein the coating material flows to the nozzle through the throttle valve opened, and the nozzle is configured for spraying the coating material toward the inside of the nozzle parameter measuring device;
- wherein the controller is configured for recording an activation time for transmitting the control signal and the covering time when the emitted light emitted by the light sensor in the nozzle parameter measuring device is covered by the coating material, and calculating a spraying delay time based on the activation time and the covering time;

wherein the spraying delay time and the spraying width are provided to a digital twin system to establish a spraying behavior model of the nozzle.

Compared with the related technologies, the disclosure uses a nozzle parameter measuring device to project size of the spraying width to the lateral horizontal plane, which can solve the problem of an inaccurate measuring result caused by an upward projection measuring method because high-pressure gas causes a diameter of the spraying width on a reference plane to expand outward. And, by calculating a time difference between the throttle valve being opened and the time when the emitted light emitted by the light sensor is covered by the coating material, the spraying delay time can be calculated, so a more accurate spraying behavior model can be established.

DETAILED DESCRIPTION

In cooperation with the attached drawings, the technical contents and detailed description of the disclosure are described hereinafter according to multiple embodiments, being not used to limit its executing scope. Any equivalent variation and modification made according to appended claims are all covered by the claims claimed by the disclosure.

Figure 1:
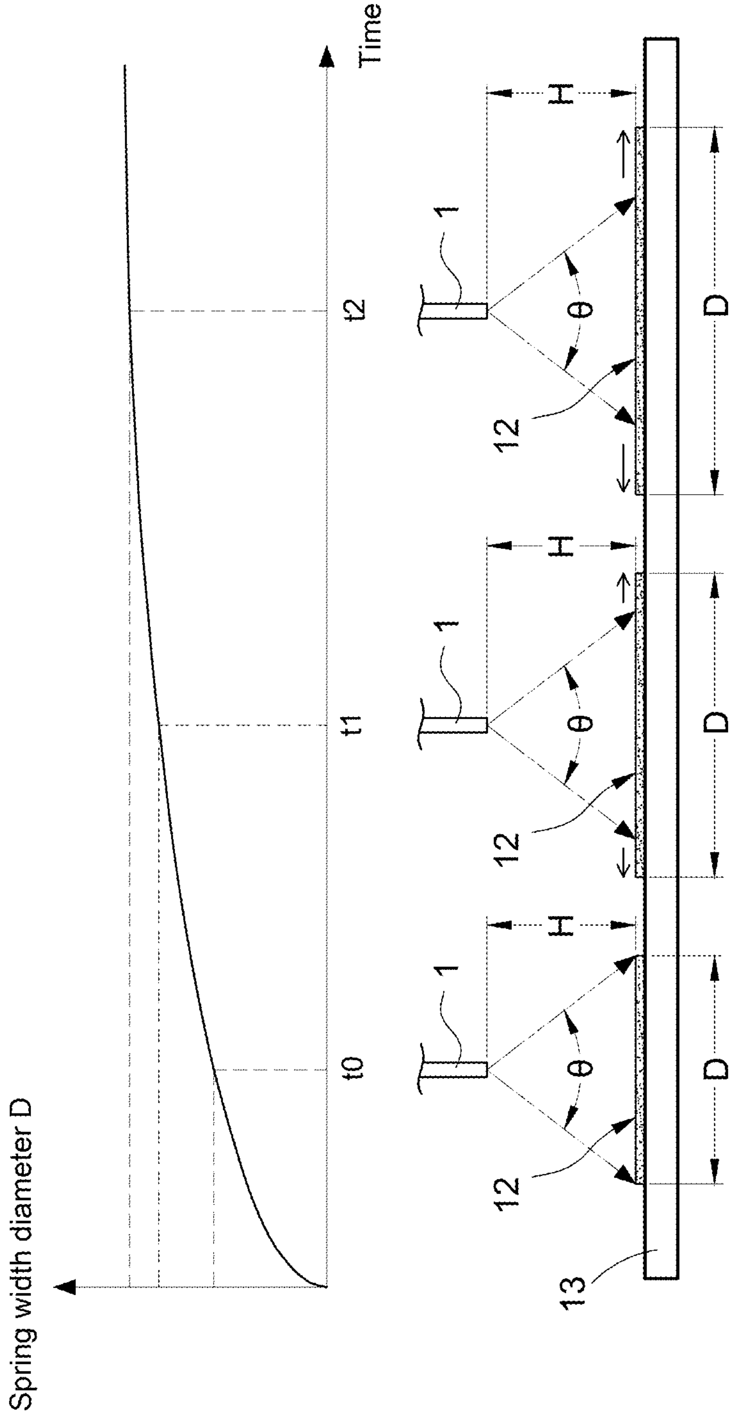
FIG.1 (Related Art)
FIG. 1 is a schematic diagram of a spraying width spreading with a measurement time in the related art.
Figure 2A:
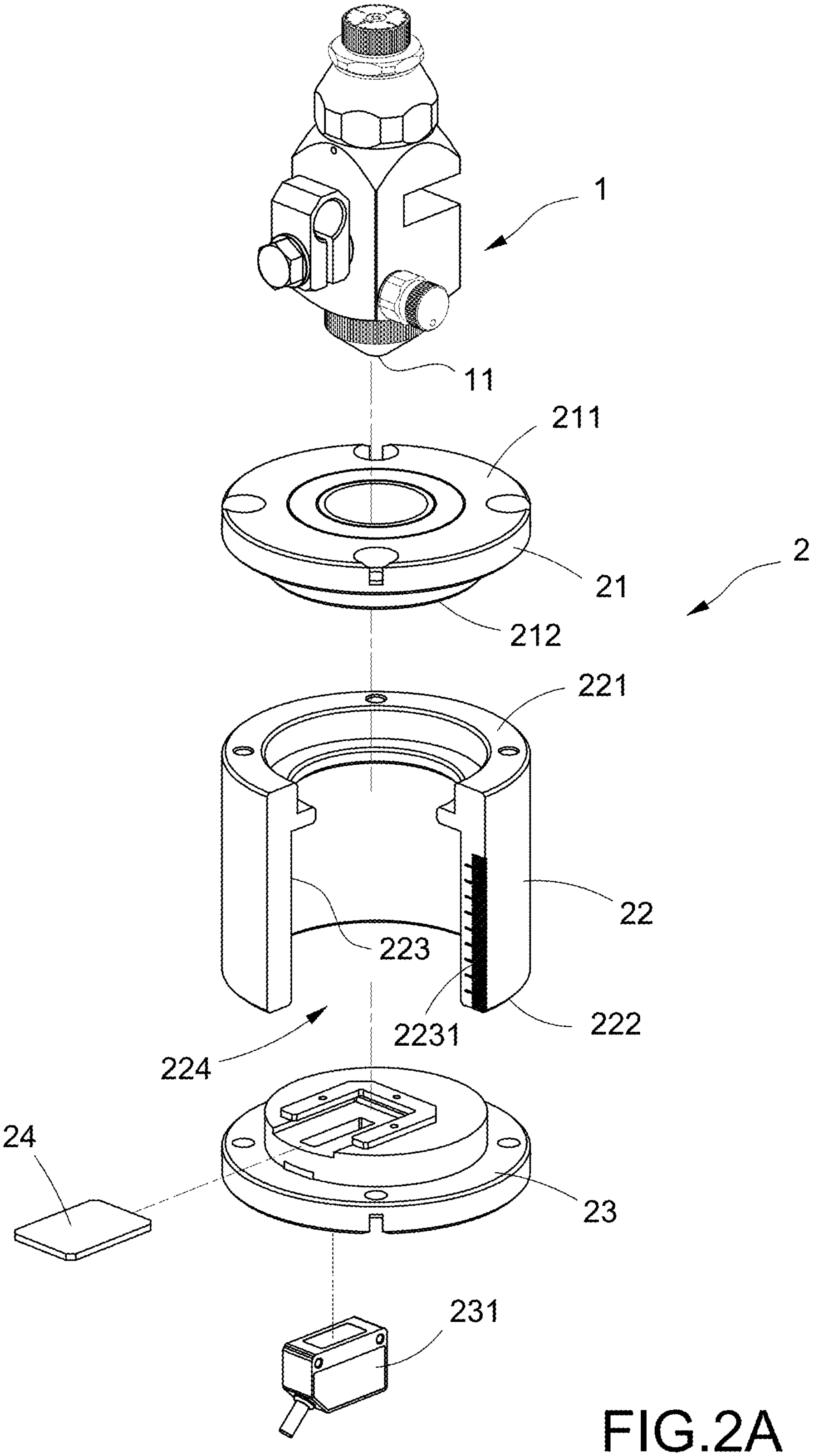
FIG. 2A is a specific embodiment of an exploded diagram of a nozzle parameter measuring device of the disclosure.
Figure 2B:
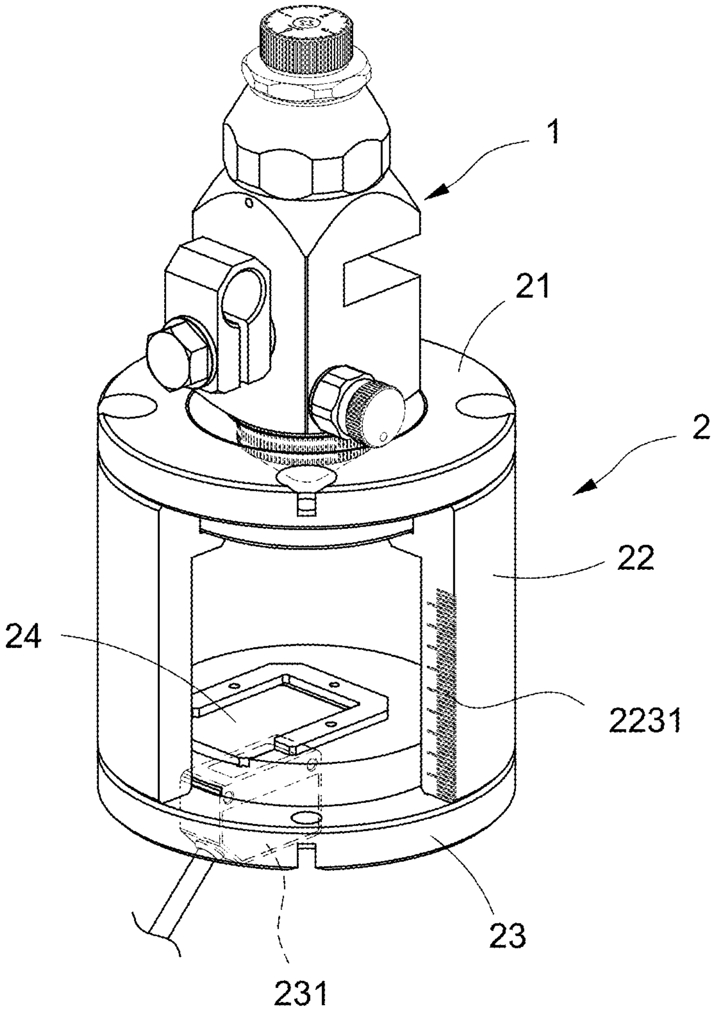
FIG. 2B is a specific embodiment of a combined diagram of the nozzle parameter measuring device of the disclosure.

Reference is made to FIG. 2A and FIG. 2B, which are respectively specific embodiments of an exploded diagram and a combined diagram of a nozzle parameter measuring device of the disclosure. The disclosure discloses a nozzle parameter measuring device (hereinafter referred to as a measuring device 2 in the description). The measuring device 2 is connected to the nozzle 1 to be measured to measure the spraying width of the nozzle 1 when the nozzle performs spraying behavior.

As shown in FIG. 2A and FIG. 2B, the measuring device 2 of the disclosure has a hollow cylinder structure. When the measuring device 2 is connected to the nozzle 1 to be measured, an output port 11 of the nozzle 1 is completely covered. Therefore, when the nozzle 1 starts to spray a coating material through the output port 11, the coating material is sprayed toward inside of the measuring device 2 and adheres to the inside of the measuring device 2. The measuring device 2 of the disclosure projects a size of the spraying width onto a lateral horizontal plane (i.e., an inner wall of the measuring device 2), so a diameter and a height of the spraying width are not changed due to continuous spraying action of the nozzle 1. In this way, a user or a system may calculate an accurate spraying angle, thereby conducive to establishing an accurate spraying behavior model for the nozzle 1 in a digital twin system, accurately simulating the behavior, and making the spraying behavior of nozzle 1 be highly predictability.

As shown in FIG. 2A and FIG. 2B, the measuring device 2 of the disclosure mainly includes a connection part 21, a measuring kit 22, and a sensing part 23. The connection part 21 has a first side 211 and a second side 212 opposite to the first side 211, where the first side 211 is used for connecting to the nozzle 1 and the second side 212 is used for connecting to the measuring kit 22. In one embodiment, the first side 211 is a top surface of the connection part 21 and the second side 212 is a bottom surface of the connection part 21.

In the embodiment of FIG. 2A and FIG. 2B, the connection part 21 has an annular structure and has an opening at a center of the connection part 21. A size of this opening is greater than or equal to a size of the output port 11 of the nozzle 1. When the measuring device 2 is connected to the nozzle 1 through the first side 211 of the connection part 21, a position of the output port 11 of the nozzle 1 is exactly at a position of the opening on the connection part 21. When the nozzle 1 sprays the coating material, the coating material passes through the opening on the connection part 21 and enters inside of the measuring kit 22.

In one embodiment, the connection part 21 is a magnet seat. When the measuring device 2 attaches the nozzle 1, the measuring device 2 is automatically attracted to the nozzle 1 through the magnet seat. In other embodiments, the connection part 21 is also attached to the nozzle 1 through other structures and methods, and is not limited to the aforementioned magnetic attaching method.

The measuring kit 22 is a hollow cylinder and has a third side 221 and a fourth side 222 opposite to the third side 221. In one embodiment, the third side 221 is a top surface of the measuring kit 22 and the fourth side 222 is a bottom surface of the measuring kit 22. In the disclosure, the measuring kit 22 is connected to the second side of the connection part 21 through the third side 221 and is connected to the sensing part 23 through the fourth side 222.

The inside of the measuring kit 22 has an inner wall 223. An inner diameter of the measuring kit 22 is greater than or equal to a diameter of the opening of the connection part 21. When the nozzle 1 sprays the coating material toward the inside of the measuring kit 22, the coating material is coated on the inner wall 223 of the measuring kit 22. By using the measuring device 2, the user or the system calculates the spraying width of the nozzle 1 based on a position of the coating material on the inner wall 223 of the measuring kit 22.

Specifically, the inner diameter of the measuring kit 22 of the disclosure is directly regarded as the diameter of the spraying width of the nozzle 1, and the position of the coating material on the inner wall 223 of the measuring kit 22 is regarded as the height of the spraying width. After obtaining the diameter and the height, the user or system directly and accurately calculates an angle of the spraying width of the nozzle 1 when spraying the coating material.

More specifically, the position on the measuring kit 22 being parallel to the output port 11 of the nozzle 1 is used as a height calculation reference plane. Based on the height calculation reference plane and the position where the coating material is coated on the inner wall 223 of the measuring kit 22, the user or the system calculates the height of the spraying width. In one embodiment, the diameter of the spraying width is equal to the inner diameter of the measuring kit 22. In this way, the user or the system calculates the angle of the spraying width through a following formula 1.

$$\theta = 2\tan^{-1}\frac{D}{2H}. \quad \text{Formula 1}$$

In the formula 1, θ is the angle of the spraying width, D is the diameter of the spraying width, and H is the height of the spraying width.

In one embodiment, multiple scales 2231 are provided on the inner wall 223 of the measuring kit 22 by laser engraving or other methods. Each scale 2231 records a height (e.g., 3 cm or 5 cm, etc.) of a position of the scale 2231 relative to the height calculation reference plane on the measuring device 2. When the nozzle 1 sprays the coating material toward the inside of the measuring kit 22 and makes the coating material adhere to the inner wall 223 of the measuring kit 22, the user or the system directly obtains a height H of the spraying width by observing the scale 2231 on the inner wall 223.

Figure 3:
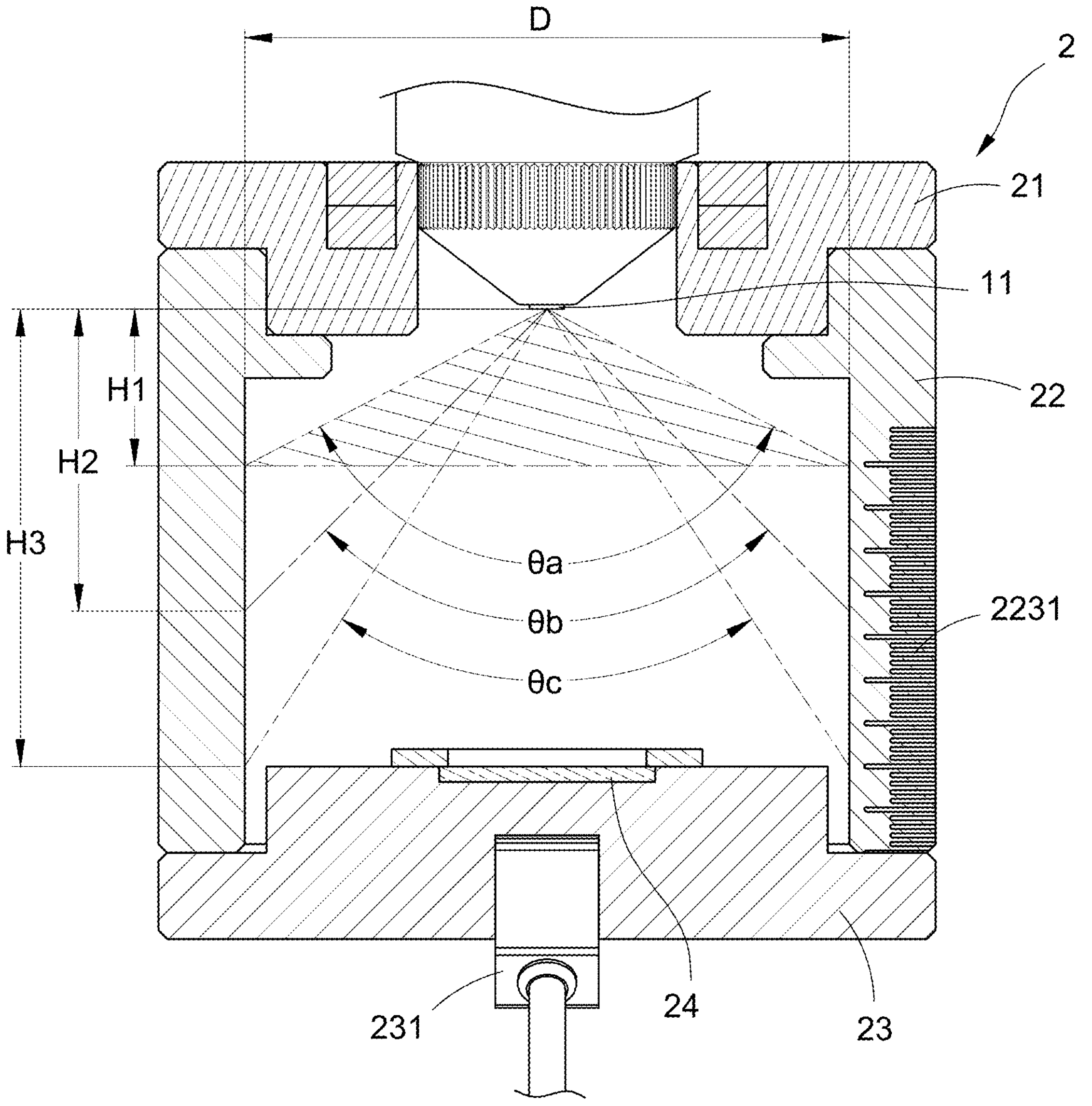
FIG. 3 is a specific embodiment of a measurement schematic diagram of the spraying width of the disclosure.

Reference is also made to FIG. 3, which is a specific embodiment of a measurement schematic diagram of the spraying width of the disclosure. As shown in FIG. 3, when the nozzle 1 sprays the coating material toward the inside of the measuring kit 22, based on the spraying width of the nozzle 1, the coating material is coated on one of the scales 2231 on the inner wall 223 of the measuring kit 22, and this scale 2231 has a specific height (e.g., a height H1, H2, or H3 as shown in FIG. 3) relative to the height calculation reference plane. In the disclosure, the height represented by this scale 2231 is the height H of the spraying width of the nozzle 1. And, a diameter D of the spraying width of the nozzle 1 is directly regarded as equal to the inner diameter of the measuring kit 22. In this way, after measuring the height H and the diameter D of the spraying width through the measuring device 2, the user or the system directly calculates an angle θ of the spraying width through the formula 1.

In the embodiment of FIG. 3, the inner diameter of the measuring kit 22 is fixed to the diameter D. If the height of the spraying width is measured to be H1, the user or the system calculates the angle of the spraying width as $\theta_a$ through the formula 1; if the height of the spraying width is measured to be H2, the user or the system calculates the angle of the spraying width as $\theta_b$ through the formula 1; if the height of the spraying width is measured to be H3, the user or the system calculates the angle of the spraying width as $\theta_c$ through the formula 1.

It should be noted that when the nozzle 1 continues to spray the coating material, airflow pushes the coating material on the inner wall 223 downward. However, in the disclosure, downward expansion of the coating material inside the measuring kit 22 does not affect the diameter D and the height H, so the downward expansion does not make the calculated angle of the spraying width inaccurate.

Returning to FIG. 2A. The measuring kit 22 of the disclosure is the hollow cylinder. In one embodiment, the measuring kit 22 has an opening 224 connecting the third side 221 and the fourth side 222. Through the arrangement of the opening 224, the multiple scales 2231 on the inner wall 223 are directly exposed outside the measuring kit 22, and the user or a sensing unit (not shown in the figure) of the system directly observes the scale 2231 on the inner wall 223 of the measuring kit 22 from outside of the measuring kit 22. In this way, after the nozzle 1 starts spraying, the user uses naked eyes to see through the position of the coating material on the scale 2231 and directly observes the height H of the spraying width without using other auxiliary equipment for observation or detection. On the other hand, the system also directly identifies the position of the coating material on the scale 2231 through the sensing unit (e.g., an image capturing device), thereby obtaining the height H of the spraying width.

In one embodiment, a size of the opening 224 is at least one quarter of a size of an outer area of the measuring kit 22, but is not limited thereto. In other embodiments, the opening 224 also occupies one third or half of the size of the outer area of the measuring kit 22, and is not limited to what is shown in FIG. 2A and FIG. 2B. The arrangement of the opening 224 not only facilitates the user or the system to directly observe the height H of the spraying width, but also facilitates cleaning of the measuring device 2 after measuring.

The sensing part 23 is disposed relatively to the fourth side 222 of the measuring kit 22. In one embodiment, the sensing part 23 is disposed at a bottom of the measuring kit 22. A light sensor 231 is provided in the sensing part 23. The light sensor 231 is disposed directly facing a direction of the nozzle 1 and is used for emitting the emitted light in the direction of the nozzle 1. In one embodiment, the light sensor 231 is a laser displacement meter, and the emitted light emitted by the light sensor 231 is laser light, but it is not limited to this.

In one embodiment, the output port 11 of the nozzle 1 and the light sensor 231 are arranged vertically. Before the nozzle 1 starts spraying, the emitted light emitted by the light sensor 231 is not covered and reaches the nozzle 1 or the top surface of the measuring kit 22. When the nozzle 1 starts spraying, the emitted light emitted by the light sensor 231 is covered by the coating material. At this time, the light sensor 231 detects and records the covering time when the emitted light is covered by the coating material. A delay time (hereinafter referred to as a spraying delay time) exists from a time when the nozzle 1 is controlled to start spraying the coating material to a time when the emitted light of the light sensor 231 is covered. This spraying delay time is also an important parameter when the digital twin system establishes a spraying behavior model.

As mentioned above, in the disclosure, after connecting the nozzle 1 to the measuring device 2, the nozzle 1 sprays the coating material towards the inside of the measuring device 2, with the light sensor 231 on the measuring device 2 disposed directly facing the direction of the nozzle 1. In order to protect the light sensor 231 from being contaminated by the coating material sprayed by the nozzle 1, the disclosure further provides a protective mirror 24 on the measuring device 2. As shown in FIG. 2A, the measuring kit 22 has an opening 224 connected to the third side 221 and the fourth side 222. The sensing part 23 is placed with a drawer structure close to a position of the measuring kit 22, and a protective mirror 24 is disposed in a removable way inside the measuring kit 22 through the drawer structure. Through using the protective mirror 24, the light sensor 231 is protected from being directly covered by the coating material during the measuring process. And, through disposing the drawer structure, the user or the system removes the protective mirror 24 at any time after measuring (or during the measuring process) to maintain functionality of the light sensor 231 (i.e., detecting a time when the emitted light is covered by the coating material).

Figure 4:
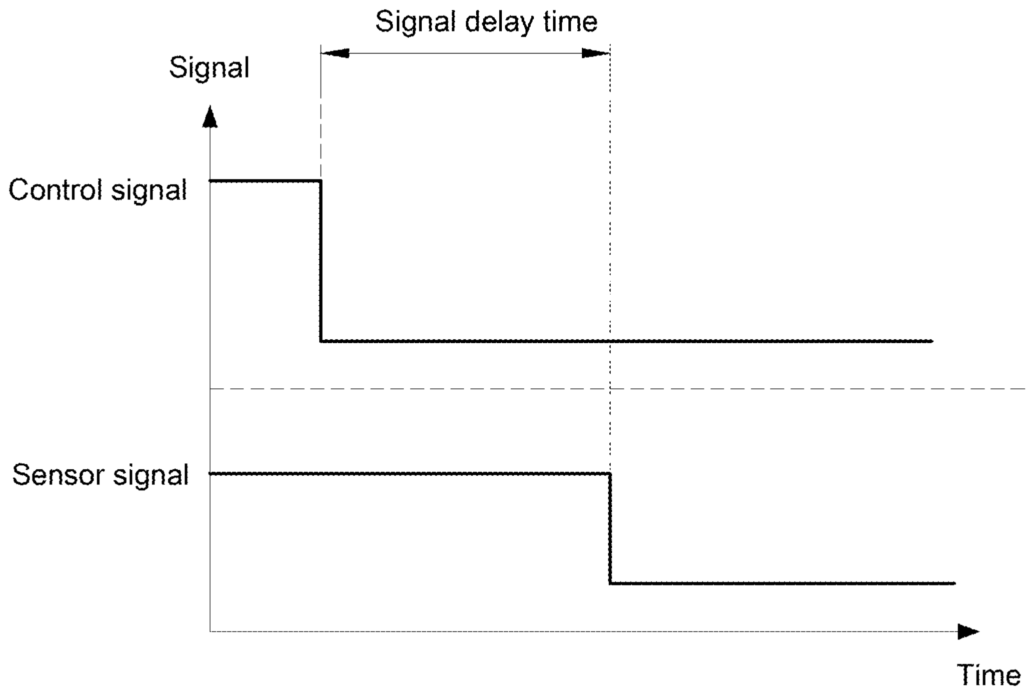
FIG. 4 is a specific embodiment of a signal delay diagram.
Figure 5A:
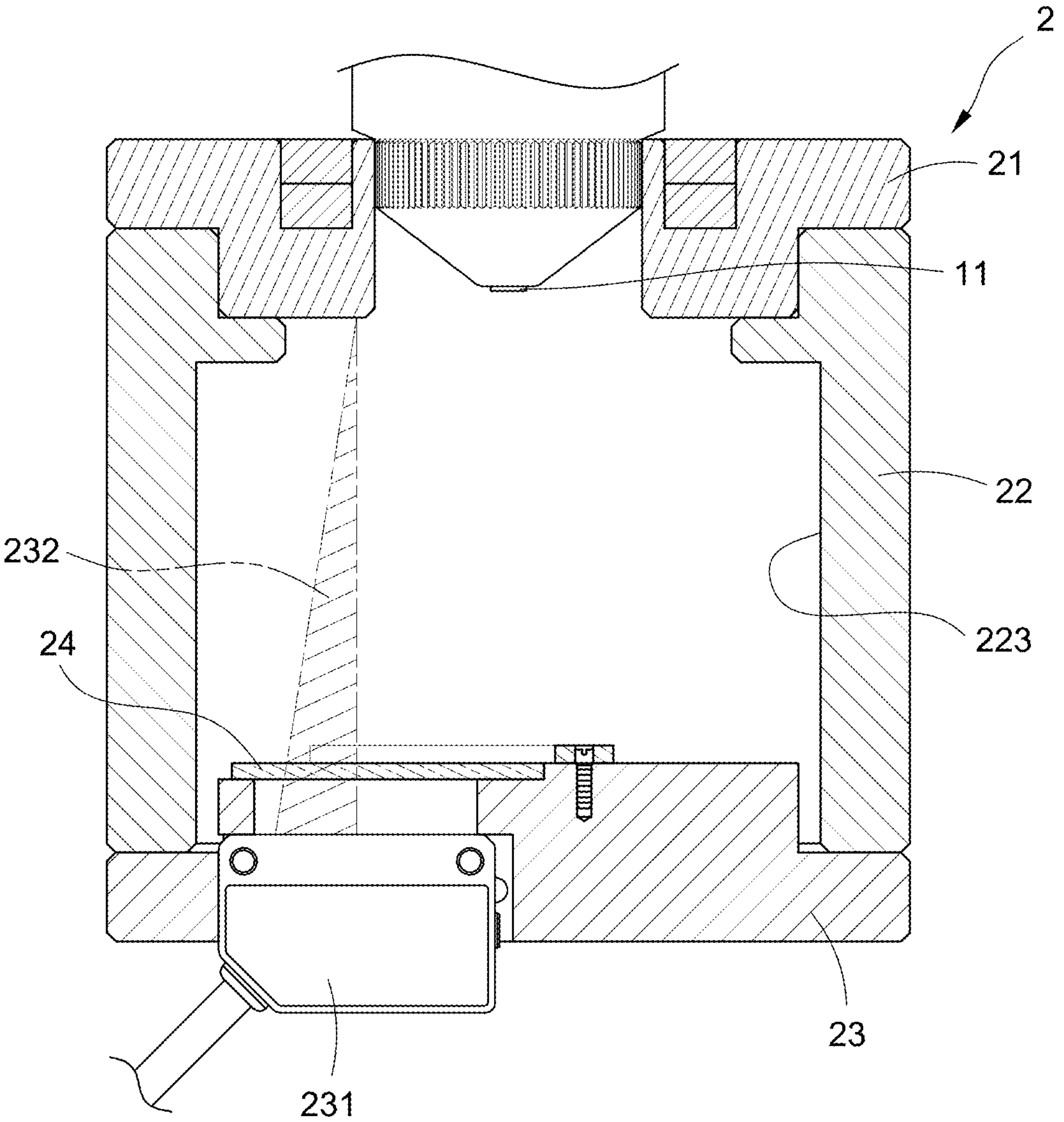
FIG. 5A is a specific embodiment of a schematic diagram before an emitted light is covered of the disclosure.
Figure 5B:
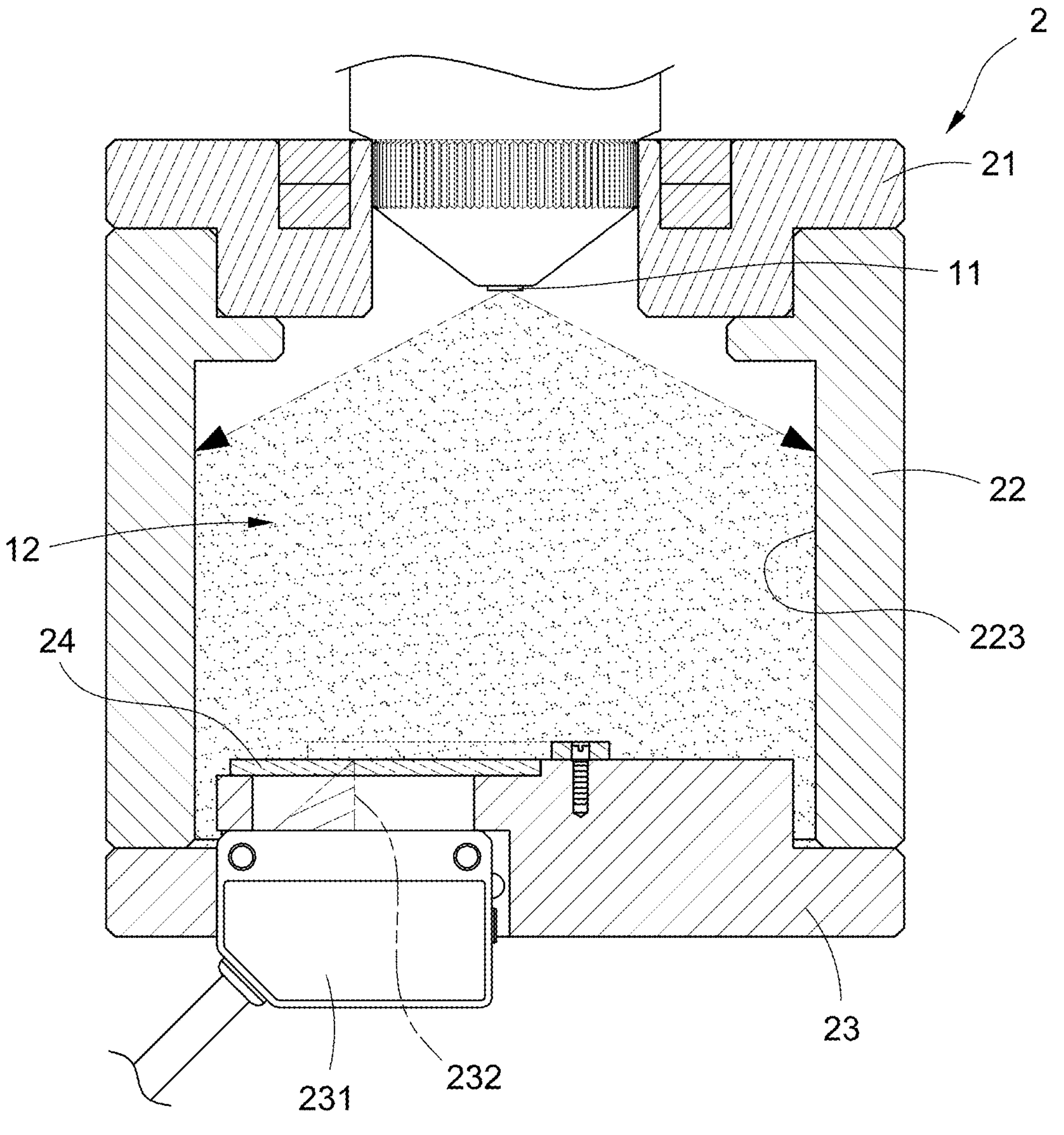
FIG. 5B is a specific embodiment of a schematic diagram after the emitted light is covered of the disclosure.

Reference is made to FIG. 4, FIG. 5A, and FIG. 5B at the same time, where FIG. 4 is a specific embodiment of a signal delay diagram, FIG. 5A and FIG. 5B are specific embodiments of schematic diagrams before and after the emitted light is covered of the disclosure.

Figure 6:
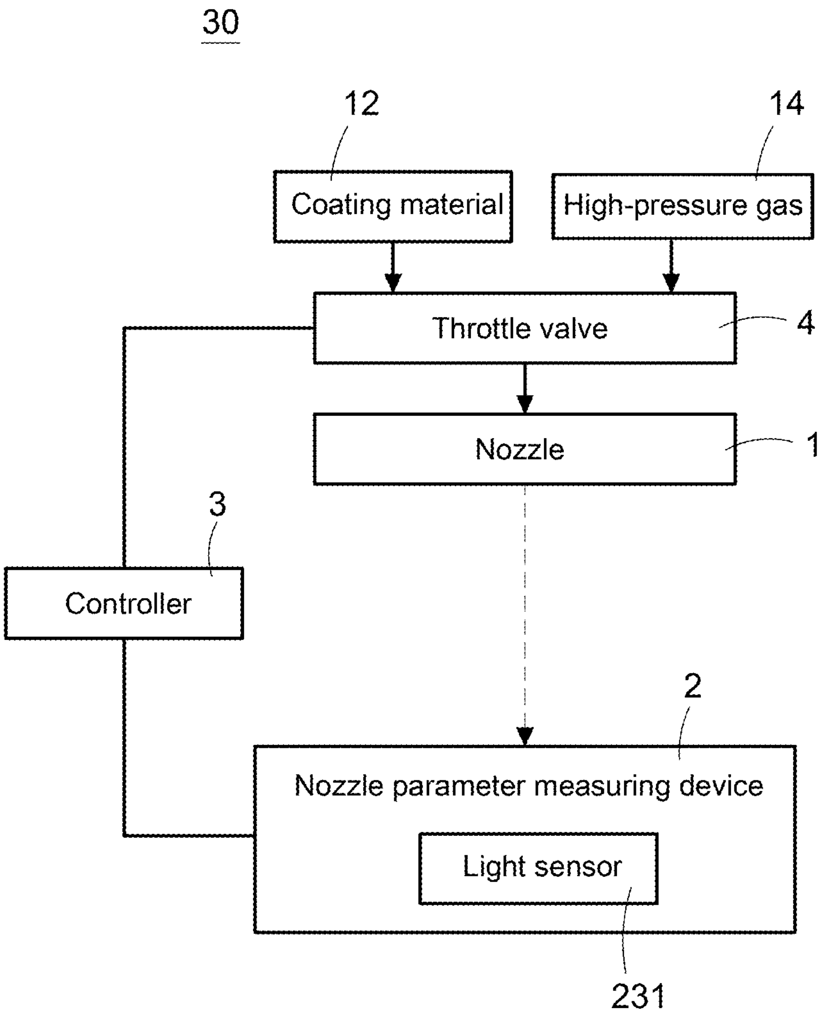
FIG. 6 is a specific embodiment of a block diagram of a measuring system of the disclosure.

In the disclosure, the nozzle 1 is mainly controlled by a controller (a controller 3 as shown in FIG. 6). As shown in FIG. 4, after the controller transmits a control signal triggering the nozzle 1, a signal delay time elapses before the light sensor 231 senses that the emitted light emitted by the light sensor 231 is covered and obtains a sensor signal correspondingly. In other words, the spraying delay time exists between a time when the controller triggers the nozzle 1 to start spraying the coating material and a time when the light sensor 231 detects that the coating material is sprayed out. This spraying delay time at least includes an electrical transmission time after the control signal is transmitted, an actuation delay time of the throttle valve (a throttle valve 4 shown in FIG. 6), a delay time caused by compressibility of the gas, and a time when the coating material is transported from the output port 11 of the nozzle 1 to the protective mirror 24 and then covers the emitted light.

As shown in FIG. 5A, before the nozzle 1 is triggered, the emitted light 232 emitted by the light sensor 231 is not covered and reaches the output port 11 of the nozzle 1 or the third side 221 of the measuring kit 22. As shown in FIG. 5B, when the nozzle 1 is triggered and sprays the coating material 12 toward the inside of the measuring kit 22, part of the coating material 12 is directly coated to the inner wall 223 of the measuring kit 22, and another part of the coating material 12 falls into the measuring kit 22 to cover the protective mirror 24 and cover the emitted light 232 emitted by the light sensor 231. When the emitted light 232 is covered by the coating material 12, the light sensor 231 detects and records a covering time. In the disclosure, the controller 3 calculates the spraying delay time based on an activation time of transmitting the control signal and the covering time of covering the emitted light 232.

In some embodiments, production line needs to establish a spraying behavior model of the nozzle 1 through the digital twin system. Therefore, evaluating and recording the spraying delay time is beneficial to establishing a more accurate spraying behavior model.

Reference is made to FIG. 6, which is a specific embodiment of a block diagram of a measuring system of the disclosure. FIG. 6 discloses a nozzle parameter measuring system of the disclosure (hereinafter referred to as a measuring system 30), and the measuring system 30 mainly includes the aforementioned measuring device 2, the nozzle 1, the controller 3, and the throttle valve 4.

As shown in FIG. 6, the controller 3 is electrically connected to the measuring device 2 to control the light sensor 231 in the measuring device 2 and receive the covering time detected by the light sensor 231. The controller 3 is also electrically connected to the throttle valve 4 to transmit the control signal triggering the throttle valve 4 to open and close.

One end of the nozzle 1 is connected to the throttle valve 4, and another end of the nozzle 1 is connected to the measuring device 2. When the controller 3 transmits the control signal to the throttle valve 4 and controls the throttle valve 4 to open, the coating material 12 mixes with the high-pressure gas 14 to transport to the nozzle 1 through the throttle valve 4 opened, so the nozzle 1 sprays the coating material 12 into the inside of the measuring device 2.

In one embodiment, the controller 3 records the activation time when the control signal is transmitted to trigger the throttle valve 4 to open. In one embodiment, the light sensor 231 in the measuring device 2 records the covering time when the emitted light 232 is covered by the coating material 12, and the controller 3 obtains the covering time from the light sensor 231. In this way, the controller 3 calculates the spraying delay time based on the activation time and the covering time. On the other hand, through using the measuring device 2, the measuring system 30 automatically or manually obtains the diameter D and the height H of the spraying width of the nozzle 1, so that the controller 3 calculates the angle θ of the spraying width based on the diameter D and the height H.

In the disclosure, the measuring system 30 provides the spraying width (including the diameter D, the height H, and the angle θ) and the spraying delay time of the nozzle 1 to the digital twin system (not shown in the figure), so that the digital twin system establishes the spraying behavior model of the nozzle 1 based on the spraying width and the spraying delay time. In this way, the spraying behavior model established by the digital twin system perfectly simulates a pattern when the nozzle 1 performs actual spraying operations, thereby using the model to make accurate predictions. Finally, in addition to being able to implement model driven simulation solutions, the digital twin system also implements data driven simulation solutions, thereby obtaining better predictivity than the digital twin system in related technologies.

Specifically, applying virtual machines through the digital twin system is common in the production line. Through the measuring device and the measuring system of the disclosure, obtaining the necessary parameter (i.e., the aforementioned spraying width and the spraying delay time) of the nozzle 1 when used in real world assists the digital twin system to establish the spraying behavior model more accurate and practical. Through using the spraying behavior model for simulation, the digital twin system helps the user in identifying practicality level of the nozzle in advance and predicting results of using this nozzle for processing in the real world in advance. It is of great help for the current production line.

Figure 7:
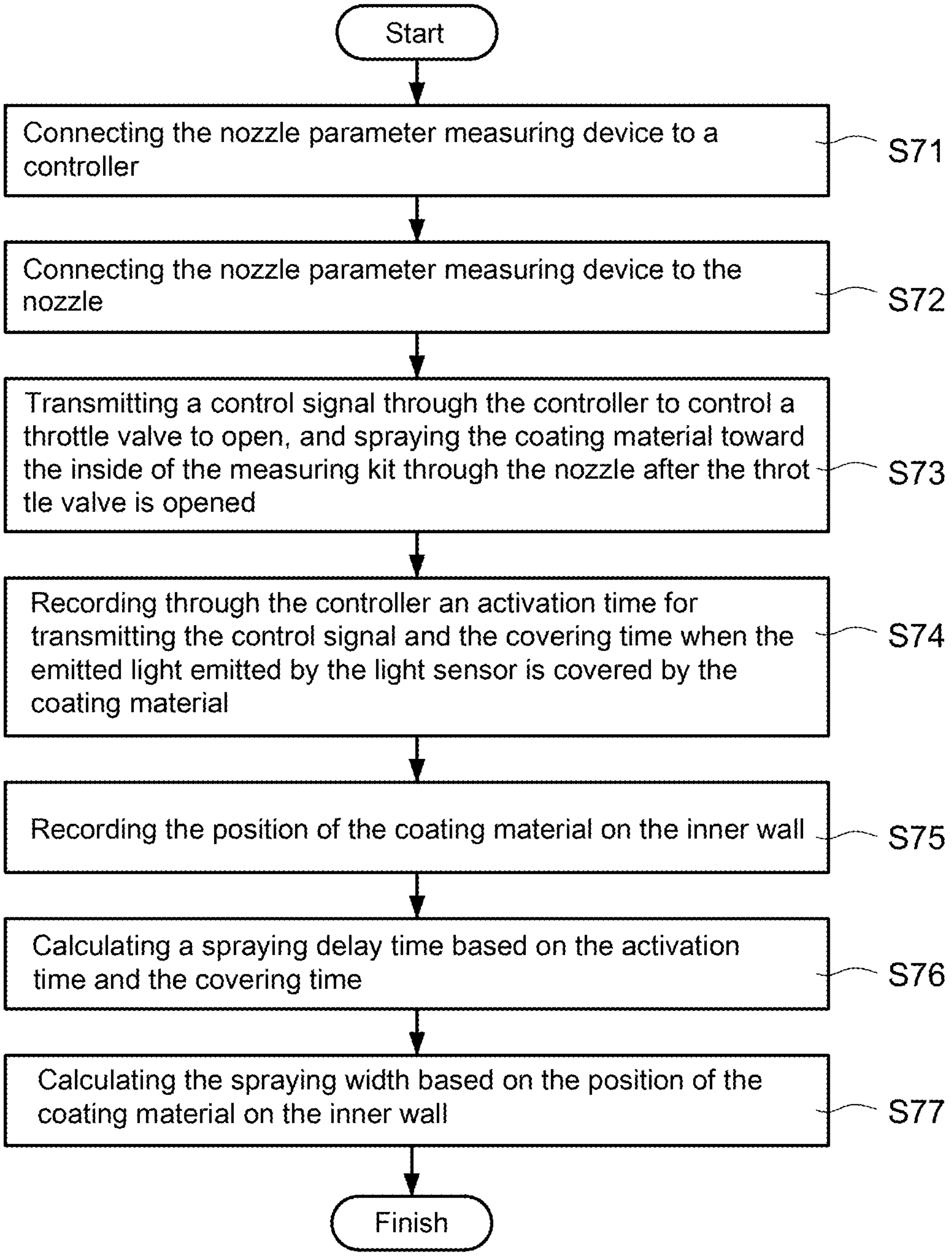
FIG. 7 is a specific embodiment of a flow chart of measuring of the disclosure.

Reference is made to FIG. 2A, FIG. 2B, FIG. 6 and FIG. 7 at the same time, where FIG. 7 is a specific embodiment of a flow chart of measuring of the disclosure. FIG. 7 discloses a nozzle parameter measuring method (hereinafter referred to as the measuring method) of the disclosure. This measuring method is applied to the measuring device 2 shown in FIG. 2A to FIG. 2B and the measuring system 30 shown in FIG. 6, but not limited to this.

As shown in FIG. 7, to use the measuring device 2 of the disclosure for measuring, the measuring device 2 is first connected to the controller 3 of the measuring system 30 (step S71), and then the measuring device 2 is connected to the nozzle 1 (step S72). Specifically, step S71 makes the light sensor 231 in the measuring device 2 to be electrically connected to the controller 3, so that the controller 3 obtains the covering time detected by the light sensor 231. Step S72 fixes the measuring device 2 to the output port 11 of the nozzle 1 in ways of magnetic attraction (when the connecting part 21 of the measuring device 2 is the magnet seat), locking, or pressing, so that the nozzle 1 sprays the coating material 12 toward the inside of the measuring device 2.

After the setting of the measuring device 2 is completed, the controller 3 of the measuring system 30 transmits the control signal to the throttle valve 4 to control the throttle valve 4 to open. At this time, the coating material 12 is mixed with the high-pressure gas 14 and flows into the nozzle 1 via the throttle valve 4, and the nozzle 1 sprays the coating material 12 toward the inside of the measuring kit 22 of the measuring device 2 (step S73).

Before the nozzle 1 sprays the coating material 12, the light sensor 231 of the measuring device 2 emits the emitted light 232 in the direction of the nozzle 1. In one embodiment, the controller 3 controls the light sensor 231 of the measuring device 2 to emit the emitted light 232 when measuring the spraying width of the nozzle 1. In another embodiment, the measuring device 2 automatically controls the light sensor 231 to emit the emitted light 232, or the user manually controls the light sensor 231 to emit the emitted light 232.

After step S73, the nozzle 1 begins to spray the coating material 12 toward the inside of the measuring kit 22. Part of the coating material 12 is coated on the inner wall 223 of the measuring kit 22, and another part of the coating material 12 falls inside the measuring kit 22 and covers the emitted light 232 emitted by the light sensor 231. In the disclosure, when the controller 3 transmits the control signal to trigger the throttle valve 4 to open, the controller 3 also records the activation time when the control signal is transmitted. And, the light sensor 231 detects whether the emitted light 232 is covered by the coating material 12, and generate the covering time when the emitted light 232 is covered by the coating material 12 (step S74). In one embodiment, the controller 3 obtains the covering time from the light sensor 231.

On the other hand, after the throttle valve 4 is opened and the nozzle 1 starts spraying the coating material 12, the user or the measuring system 30 records the position where the coating material 12 is coated on the inner wall 223 of the measuring kit 22 (Step S75). In one embodiment, the user directly observes the scale 2231 on the inner wall 223 of the measuring kit 22 to obtain the height H of the spraying width. In another embodiment, the measuring system 30 automatically detects and identifies the scale 2231 on the inner wall 223 of the measuring kit 22 through the image capturing device (not shown in the figure) to obtain the height H of the spraying width.

After steps S74 and S75, the controller 3 of the measuring system 30 calculates the spraying delay time of the nozzle 1 based on the activation time and the covering time (step S76). And, the controller 3 calculates the spraying width of the nozzle 1 based on the position where the coating material 12 is coated on the inner wall 223 of the measuring kit 22 (step S77). Specifically, the controller 3 mainly uses the inner diameter of the measuring kit 22 as the diameter of the spraying width, calculates the height of the spraying width based on the position of scale 2231, and calculates the angle of the spraying width according to the aforementioned formula 1 based on the diameter of the spraying width and the height of the spraying width. The spraying width referred to in the disclosure includes the diameter, the height, and the angle of the spraying width.

As mentioned above, the diameter and height of the spraying width being measured are highly correlated with the measuring device 2 itself. In one embodiment, the user needs to select an appropriate measuring device 2 based on an initial parameter of the nozzle 1. Specifically, the disclosure provides a variety of the measuring devices 2 with different sizes, the measuring kits 22 of each measuring instrument 2 have the same, similar or different inner diameters, and the measuring kits 22 of each measuring device 2 have different lengths to match different spraying widths. In the disclosure, when the user or the measuring system 30 uses the measuring device 2 to measure the spraying width of the nozzle 1, the measuring device 2 with a corresponding size is selected based on the initial parameter of the nozzle 1, such as a short axis measuring device, a central axis measuring device, or a long axis measuring device, etc., but are not limited to this.

Figure 8:
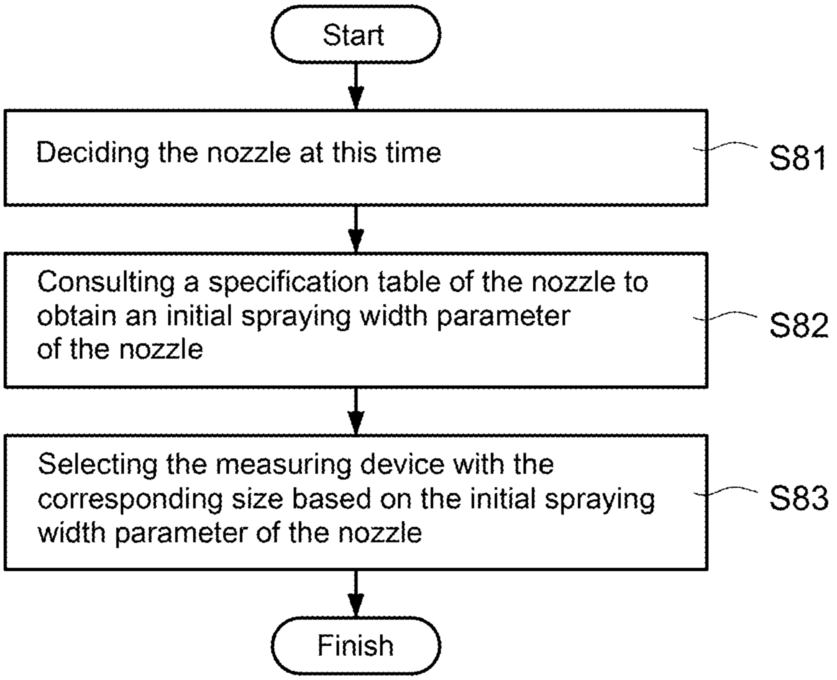
FIG. 8 is a specific embodiment of a flow chart of selecting of the nozzle parameter measuring device of the disclosure.

Reference is made to FIG. 8, which is a specific embodiment of a flow chart of selecting of the nozzle parameter measuring device of the disclosure. As shown in FIG. 8, the user or the measuring system 30 first decides the nozzle 1 at this time (step S81). Specifically, the user or the measuring system 30 decides a type, a version, or a size of the nozzle 1.

Next, the user or the measuring system 30 consults a specification table of the nozzle 1 to obtain an initial spraying width parameter of the nozzle 1 (step S82). The specification table is provided by a manufacturer of the nozzle 1, and records various parameters of the nozzle 1 when originally shipped from the factory, including the initial spraying width parameter of the nozzle 1. In some embodiments, the digital twin system directly establishes the spraying behavior model of the nozzle 1 based on the initial spraying width parameter. However, this initial spraying width parameter does not include the spraying delay time. In addition, the initial spraying width parameter is relative to all nozzles 1 with the same vision, but some nozzles 1 have actual spraying widths different from the initial spraying width parameter due to production or assembly errors. If the spraying behavior model of the nozzle 1 is directly established based on the initial spraying width parameter recorded in the specification table, the simulation and the prediction results of the digital twin system based on this spraying behavior model are inaccurate.

The errors can exist between the actual spraying width of the nozzle 1 and the initial spraying width parameter, but overall, the difference is not too large. Therefore, the disclosure corresponds the initial spraying width parameters within different ranges to the measuring devices 2 with different sizes in advance. For example, the multiple initial spraying width parameters within a first spraying width range are relative to the short axis measuring devices, the multiple initial spraying width parameters within a second spraying width range are relative to the central axis measuring devices, and the multiple initial spraying width parameters within the third spraying width range to the long axis measuring devices, and so on. After deciding the nozzle 1 at this time, the user or the measuring system 30 selects the measuring device 2 with the corresponding size based on the initial spraying width parameter (or the spraying width range being relative) of the nozzle 1 (Step S83). After selecting the appropriate measuring device 2, the user or the measuring system 30 uses the measuring device 2 to measure the actual spraying width and the spraying delay time of the nozzle 1 based on the steps shown in FIG. 7. After the actual spraying width and the spraying delay time are measured, the user or the measuring system 30 imports the actual spraying width and the spraying delay time into the digital twin system, thereby assisting the digital twin system to establish the spray behavior model being accurate for the nozzle 1 by using the actual spraying width and the spraying delay time.

As the skilled person will appreciate, various changes and modifications can be made to the described embodiment. It is intended to include all such variations, modifications and equivalents which fall within the scope of the disclosure, as defined in the accompanying claims.

What is claimed is:

1. A nozzle parameter measuring device, configured for connecting a nozzle to be measured and measuring a spraying width of the nozzle when the nozzle sprays a coating material, comprising:

a connection part, having a first side for connecting with the nozzle and a second side opposite to the first side;

a measuring kit, being a hollow cylinder with an inner wall, wherein the measuring kit has a third side connected to the second side and a fourth side opposite to the third side, and the coating material is coated on the inner wall when the nozzle sprays the coating material toward inside of the measuring kit; and a sensing part, disposed relative to the fourth side and having a light sensor disposed directly facing a direction of the nozzle, wherein the light sensor is configured for detecting a covering time when an emitted light is covered by the coating material;

wherein the spraying width is calculated based on a position of the coating material on the inner wall.

2. The nozzle parameter measuring device in claim 1, wherein the connection part is a magnet seat, and the nozzle parameter measuring device is attached to the nozzle through the magnet seat.

3. The nozzle parameter measuring device in claim 1, wherein size of the measuring kit is relative to an initial spraying width parameter of the nozzle, and the initial spraying width parameter is recorded in a specification table of the nozzle.

4. The nozzle parameter measuring device in claim 1, wherein a position on the measuring kit parallel to an output port of the nozzle is a height calculation reference plane, a height of the spraying width is calculated based on the position of the coating material on the inner wall and the height calculation reference plane, a diameter (D) of the spraying width is an inner diameter of the measuring kit, and an angle of the spraying width is calculated based on a following formula:

$$\theta = 2\tan^{-1}\frac{D}{2H},$$

wherein θ is the angle, D is the diameter, and His the height.

5. The nozzle parameter measuring device in claim 1, wherein the inner wall is deployed a plurality of scales, and each of the scales respectively records a height of a position of the scale relative to a height calculation reference plane of the nozzle parameter measuring device.

6. The nozzle parameter measuring device in claim 5, wherein the measuring kit has an opening connected to the third side and the fourth side, and the plurality of scales are exposed outside the measuring kit through the opening.

7. The nozzle parameter measuring device in claim 6, wherein a size of the opening is at least one quarter of a size of an outer area of the measuring kit.

8. The nozzle parameter measuring device in claim 6, further comprising a protective mirror, disposed on the light sensor, wherein the sensing part is placed with a drawer structure close to a position of the measuring kit, and the protective mirror is removably disposed inside the measuring kit through the drawer structure.

9. The nozzle parameter measuring device in claim 1, wherein the light sensor is a laser displacement meter.

10. A measuring method, applied to the nozzle parameter measuring device in claim 1, comprising:

step a) connecting the nozzle parameter measuring device to a controller;

step b) connecting the nozzle parameter measuring device to the nozzle (1);

step c) transmitting a control signal through the controller to control a throttle valve to open, wherein the nozzle sprays the coating material toward the inside of the measuring kit after the throttle valve is opened;

step d) recording through the controller an activation time for transmitting the control signal and the covering time when the emitted light emitted by the light sensor is covered by the coating material;

step d1) recording the position of the coating material on the inner wall;

step e) calculating a spraying delay time based on the activation time and the covering time; and step f) calculating the spraying width based on the position of the coating material on the inner wall.

11. The measuring method in claim 10, wherein the step a) further comprises following steps:

step a1) obtaining an initial spraying width parameter of the nozzle from a specification table; and step a2) selecting the nozzle parameter measuring device correspondingly based on the initial spraying width parameter, wherein size of the measuring kit is relative to a spraying width range of the initial spraying width parameter.

12. The measuring method in claim 10, wherein a position on the measuring kit parallel to an output port of the nozzle is a height calculation reference plane, wherein the step f) comprises:

step f1) calculating a height of the spraying width based on the position of the coating material on the inner wall and the height calculation reference plane;

step f2) using an inner diameter of the measuring kit as a diameter of the spraying width; and step f3) calculating an angle of the spraying width based on a following formula:

$$\theta = 2\tan^{-1}\frac{D}{2H},$$

wherein θ is the angle, D is the diameter, and H is the height.

13. The measuring method in claim 10, further comprising:

step g) importing the spraying delay time and the spraying width into a digital twin system; and step h) establishing a spraying behavior model of the nozzle through the digital twin system based on the spraying delay time and the spraying width.

14. A measuring system, comprising:

a throttle valve;

the nozzle to be measured in claim 1, which one end is connected to the throttle valve;

the nozzle parameter measuring device in claim 1, connected to the nozzle; and a controller, electrically connected to the throttle valve and the nozzle parameter measuring device, and transmitting a control signal to control the throttle valve to open, wherein the coating material flows to the nozzle through the throttle valve opened, and the nozzle is configured for spraying the coating material toward the inside of the nozzle parameter measuring device;

wherein the controller is configured for recording an activation time for transmitting the control signal and the covering time when the emitted light emitted by the light sensor in the nozzle parameter measuring device is covered by the coating material, and calculating a spraying delay time based on the activation time and the covering time;

wherein the spraying delay time and the spraying width are provided to a digital twin system to establish a spraying behavior model of the nozzle.

* * * * *